United States Patent
Elgammal (10) Patent No.: US 10,853,986 B2
(45) Date of Patent: Dec. 1, 2020

(54) CREATIVE GAN GENERATING ART DEVIATING FROM STYLE NORMS

(71) Applicant: Ahmed Elgammal, East Windsor, NJ (US)

(72) Inventor: Ahmed Elgammal, East Windsor, NJ (US)

(73) Assignee: Rutgers, the State University of New Jersey, New Brunswick, NJ (US)

( * ) Notice: Subject to any disclaimer, the term of this patent is extended or adjusted under 35 U.S.C. 154(b) by 0 days.

(21) Appl. No.: 16/447,712

(22) Filed: Jun. 20, 2019

(65) Prior Publication Data
US 2019/0392624 A1    Dec. 26, 2019

Related U.S. Application Data

(60) Provisional application No. 62/763,539, filed on Jun. 20, 2018.

(51) Int. Cl.
| | | |
|---|---|---|
| G06T 11/80 | (2006.01) | |
| G06K 9/62 | (2006.01) | |
| G10H 5/02 | (2006.01) | |
| G06N 3/08 | (2006.01) | |
| G06N 3/04 | (2006.01) | |

(52) U.S. Cl.
CPC ............ *G06T 11/80* (2013.01); *G06K 9/6259* (2013.01); *G06N 3/0454* (2013.01); *G06N 3/088* (2013.01); *G10H 5/02* (2013.01)

(58) Field of Classification Search
None
See application file for complete search history.

(56) References Cited

PUBLICATIONS

Ellie Baker and Margo I Seltzer, Evolving line drawings, 1993.
Simon Colton. Creativity versus the perception of creativity in computational systems. In AAAI spring symposium: creative intelligent systems, vol. 8, 2008.
Steve DiPaola and Liane Gabora. Incorporating characteristics of human creativity into an evolutionary art algorithm. Genetic Programming and Evolvable Machines, 10(2):97-110, 2009.
Ahmed Elgammal and Babak Saleh. Quantifying creativity in art networks. In Proceedings of the 6th International Conference on Computational Creativity, 2015.
Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pp. 2672-2680, 2014.
Jeanine Graf and Wolfgang Banzhaf. Interactive evolution of images. In Evolutionary Programming, pp. 53-65, 1995.

(Continued)

*Primary Examiner* — Vu Nguyen
(74) *Attorney, Agent, or Firm* — Haynes and Boone, LLP (57) ABSTRACT

A method and system for generating art uses artificial intelligence to analyze existing art forms and then creates art that deviates from the learned styles. Known art created by humans is presented in digitized form along with a style designator to a computer for analysis, including recognition of artistic elements and association of particular styles. A graphics processor generates a draft graphic image for similar analysis by the computer. The computer ranks such draft image for correlation with artistic elements and known styles. The graphics processor modifies the draft image using an iterative process until the resulting image is recognizable as art but is distinctive in style.

19 Claims, 3 Drawing Sheets

(56) References Cited

PUBLICATIONS

Derrall Heath and Dan Ventura. Before a computer can draw, it must first learn to see. In Proceedings of the 7th International Conference on Computational Creativity, 2016.
Sergey Ioffe and Christian Szegedy. Batch normalization: Accelerating deep network training by reducing internal covariate shift. arXiv preprint arXiv:1502.03167, 2015.
Justin Johnson, Alexandre Alahi, and Li Fei-Fei. Perceptual losses for real-time style transfer and super-resolution. In European Conference on Computer Vision, pp. 694-711. Springer, 2016.
Andrew L Maas, Awni Y Hannun, and Andrew Y Ng. Rectifier nonlinearities improve neural network acoustic models. In Proc. ICML, vol. 30, 2013.
Alexander Mordvintsev, Christopher Olah, and Mike Tyka. Inceptionism: Going deeper into neural networks. Google Research Blog. Retrieved Jun. 20:14, 2015.
Alec Radford, Luke Metz, and Soumith Chintala. Unsupervised representation learning with deep convolutional generative adversarial networks. 2016.
Scott Reed, Zeynep Akata, Xinchen Yan, Lajanugen Logeswaran, Bernt Schiele, and Honglak Lee. Generative adversarial text-to-image synthesis. In Proceedings of the 33rd International Conference on Machine Learning, 2016.
Karl Sims. Artificial evolution for computer graphics, vol. 25. ACM, 1991.
Bing Xu, NaiyanWang, Tianqi Chen, and Mu Li. Empirical evaluation of rectified activations in convolutional network. arXiv preprint arXiv:1505.00853, 2015.
Ian Goodfellow, NIPS 2016 Tutorial: Generative Adversarial Networks, OpenAI, published Apr. 3, 2017 (www.openai.com).

CREATIVE GAN GENERATING ART DEVIATING FROM STYLE NORMS

CROSS-REFERENCE TO RELATED PATENT APPLICATIONS

The present application claims the benefit of the earlier filing date of U.S. provisional patent application No. 62/763,539, filed on Jun. 20, 2018, entitled "Systems And Methods For Generating Art", the contents of which are hereby incorporated by reference as if fully contained herein.

BACKGROUND OF THE INVENTION

Field of the Invention

The present disclosure relates to systems and methods for generating art and, more particularly, to such systems and methods which generate art that deviates from learned styles of existing art.

Description of the Relevant Art

Since the dawn of artificial intelligence (AI), scientists have been exploring the machine's ability to generate human-level creative products such as poetry, stories, jokes, music, paintings, etc., as well as creative problem solving. In terms of visual art, several systems have been proposed to automatically create art, not only in the domain of AI and computational creativity but also in computer graphics, and machine learning. Within the computational creativity literature, different algorithms have been proposed focused on investigating various and effective ways of exploring the creative space.

In at least some cases in the past, an evolutionary process is used wherein an artwork candidate is generated, evaluated using a fitness function, and then modified to improve the fitness score for the next iteration. The challenge for any such system is to create a logical fitness function that has an "aesthetic sense". Some earlier systems have utilized a human in the loop with the role of guiding the process. For example, see Steve DiPaola and Liane Gabora, "Incorporating characteristics of human creativity into an evolutionary art algorithm", *Genetic Programming and Evolvable Machines*, 10(2):97-110, 2009. In these interactive systems, the computer explores the creative space, while the human plays the role of the observer whose feedback is essential in driving the process. Recent systems have emphasized the role of perception and cognition in the creative process.

Deep neural networks have recently played a transformative role in advancing artificial intelligence across various application domains. In particular, several generative deep networks have been proposed that have the ability to generate images that emulate a given training distribution. Generative Adversarial Networks (or "GANs") have been successful in achieving this goal. See generally "NIPS 2016 Tutorial: Generative Adversarial Networks", by Ian Goodfellow, *OpenAI*, published Apr. 3, 2017 (www.openai.com), the contents of which are hereby incorporated by reference as if fully set forth herein.

A GAN can be used to discover and learning regular patterns in a series of input data, or "training images", and thereby create a model that can be used to generate new samples that emulate the training images in the original series of input data. A typical GAN has two sub networks, or sub-models, namely, a generator model used to generate new samples, and a discriminator model that tries to determine whether a particular sample is "real" (i.e., from the original series of training data) or "fake" (newly-generated). The generator tries to generate images similar to the images in the training set. The generator initially starts by generating random images, and thereafter receives a signal from the discriminator advising whether the discriminator finds them to be "real" or "fake". The two models, discriminator and generator, can be trained together until the discriminator model is fooled about 50% of the time; in that case, the generator model is now generating samples of a type that might naturally have been included in the original series of data. At equilibrium, the discriminator should not be able to tell the difference between the images generated by the generator and the actual images in the training set. Hence, the generator succeeds in generating images that come from the same distribution as the training set.

However, such GANs are limited in their ability to generate creative products, since they are designed to simulate known styles/forms of art. Once again, the generator is trained to generate images that fool the discriminator into believing that the generated image is from the training set; accordingly, if the training set consists of known works of art, then the generator will simply generate images that look like already existing art. There is no ability for known GANs to generate anything creative, i.e., there is no force that pushes the generator to explore the creative space.

There are known extensions to GANs that facilitate generating images conditioned on categories or captions. A GAN can be designed to receive not only training images but also labels that characterize the type of style or art genre possessed by each such training image. For example, such labels might include, for example, "Renaissance", "Impressionism", "Baroque" or "Cubism". However that does not lead to anything creative, either. It simply allows the GAN to characterize a generated work as being from among one of such styles. Today's human artists often strive to create new works that increase the arousal potential of their art, as by creating novel, surprising, ambiguous, and/or puzzling art. This highlights the fundamental limitation of using GANs in generating creative works.

SUMMARY OF THE INVENTION

Accordingly, it is an object of the present invention to provide a new method and system for creating works of art using artificial intelligence, and producing artworks that include recognizable artistic elements while having novelty by comparison to known works of art.

It is another object of the present invention to provide such a method and system that can be formed using modified Generative Adversarial Networks, or GAN models.

It is still another object of the present invention to provide such a method and system capable of creating works of art that deviate from styles of art already learned by such a GAN model.

Yet another object of the present invention is to provide such a method and system capable of creating works of art that engender a significant degree of surprisingness by comparison to works of art already learned by such a GAN model.

Still another object of the present invention is to provide such a method and system capable of creating works of art that engender a significant degree of semantic ambiguity or puzzlingness by comparison to works of art already learned by such a GAN model.

The present invention relates to the generation of creative art by maximizing deviation from established styles, subjects and/or patterns of art, while minimizing deviation from works that are generally recognized as having artistic elements.

Briefly described, and in accordance with various embodiments, the present invention provides a method for generating art, and including providing to a computer a set of digitized data characterizing a plurality of existing works of art created by human beings; in at least some of the aforementioned embodiments, the digitized data also includes the designation of a style classification associated with each such existing work of art. The computer is used to analyze the digitized data and corresponding style designation data. The computer is trained to recognize artistic elements in such existing works of art, and creates art recognition data that associates particular artistic elements of existing works of art with particular style designations. This art recognition data is stored in a memory of the computer. In at least some of such embodiments of the invention, the analysis of the digitized data includes the use of a neural network.

A graphics processing unit, or generator, generates a first iteration of a graphic image which, in turn, is provided to the computer. Using the computer, the generated graphic image is compared to the art recognition data stored in the memory of the computer. Based upon such comparison, the computer provides an art index which ranks the generated graphic image along a scale that ranges from being recognizable as art and not being recognizable as art. In at least some embodiments of the invention, the computer also provides a novelty index which ranks the generated graphic art along a scale that ranges from being within a known style for existing works of art and not being within a known style for existing works of art.

Based upon the art index and the novelty index, the first iteration of the generated graphic image is modified to have an art index that is more recognizable as art and to have a novelty index that is less like known styles of existing works of art. These steps of comparing the generated graphic image to the stored art recognition data, providing an art index and novelty index, and modifying the generated image, are repeated until the generated graphic image produces an art index indicating that the generated graphic image is recognizable as art, while also producing a novelty index indicating the generated graphic image is not within a known style for existing works of art.

In various embodiments of the invention, the method used to generate the graphic image is an iterative enhancement process. In some embodiments of the invention, the generated graphic image that is produced reached after performing such iterative enhancement process is rendered in a tangible medium.

In various embodiments of the invention, the set of digitized data analyzed by the computer corresponds to digitized images of a number of paintings that are each fixed on a tangible medium. In other embodiments of the aforementioned invention, the set of digitized data analyzed by the computer corresponds to digitized images of a number of sculptures each fixed within a tangible medium. In still other embodiments of the aforementioned invention, the set of digitized data analyzed by the computer corresponds to a number of image sequences. In yet other embodiments of the present invention, the set of digitized data analyzed by the computer corresponds to a number of graphical designs. In further embodiments of the aforementioned invention, the set of digitized data analyzed by the computer corresponds to a number of fashion designs. In yet further embodiments of the aforementioned invention, the set of digitized data analyzed by the computer corresponds to a number of consumer product designs.

Various embodiments of the present invention include a computerized system for generating art, including a computer for receiving a set of digitized data characterizing a number of existing works of art created by human beings. In at least some of the aforementioned embodiments, the digitized data also includes the designation of a style classification associated with each such existing work of art. The computer analyzes the digitized data and corresponding style designations, including the recognition of artistic elements within the existing works of art, and creates art recognition data that associates particular artistic elements of existing works of art with particular style designations. This art recognition data may be stored in an electronic memory associated with the computer. In at least some of such embodiments of the invention, the analysis of the digitized data includes the use of a neural network.

A graphics processing unit is coupled to the computer for initially generating a first iteration of a graphic image, and presenting such graphic image to the computer. The computer compares the generated graphic image to the stored art recognition data, and then provides an art index which ranks the generated graphic image along a scale that ranges from being recognizable as art and not being recognizable as art. In at least some embodiments of the invention, the computer also provides a novelty index which ranks the generated graphic art along a scale that ranges from being within a known style for existing works of art and not being within a known style for existing works of art.

The art index and novelty index are provided to the graphics processing unit, and in response, the graphics processing unit modifies the graphic image further before presenting it to the computer. This process of generating an image, analyzing such image with the computer, generating a corresponding art index and novelty index, and providing the art index and novelty index back to the graphics processing unit to further modify the generated image, are repeated a sufficient number of times to create a final modified graphic image that results in an art index indicating that the generated graphic image is recognizable as art, while also producing a novelty index indicating the generated graphic image is not within a known style or type for existing works of art. In some embodiments, a printer is included for printing the final modified graphic image in a tangible medium.

In various embodiments of the computerized system, the set of digitized data analyzed by the computer corresponds to digitized images of a number of paintings that are each fixed on a tangible medium. In other embodiments of the computerized system, the set of digitized data analyzed by the computer corresponds to digitized images of a number of sculptures each fixed within a tangible medium. In still other embodiments of the computerized system, the set of digitized data analyzed by the computer corresponds to a number of image sequences. In yet other embodiments of the computerized system, the set of digitized data analyzed by the computer corresponds to a number of graphical designs. In further embodiments of the computerized system, the set of digitized data analyzed by the computer corresponds to a number of fashion designs. In yet further embodiments of the computerized system, the set of digitized data analyzed by the computer corresponds to a number of consumer product designs.

In various embodiments of the invention, a method for generating music includes providing to a computer a set of digitized data characterizing a number of existing musical compositions created by human beings, along with the designation of a style associated with each such existing musical composition. The computer is used to analyze the digitized data and corresponding style designations, including recognition of musical elements in the existing musical compositions, and creating music recognition data associating particular existing musical compositions with particular musical style designations. The music recognition data is stored in a memory associated with the computer.

A music synthesizer is provided to generate a first iteration of a musical composition. The generated musical composition is provided to the computer, and the computer is used to compare the generated musical composition to the stored music recognition data. Based upon such comparison, a music index is provided which ranks the generated musical composition along a scale that ranges from being recognizable as music and not being recognizable as music. Also, based upon such comparison, a novelty index is provided which ranks the generated musical composition along a scale that ranges from being within a known style for existing musical compositions and not being within a known style for existing musical compositions. The music index and novelty index are provided to the music synthesizer to modify the generated musical composition. The steps of generating the musical composition, comparing it to stored music recognition data, providing the music index and novelty index to the music synthesizer, and modifying the generated musical composition, are repeated until the generated musical composition produces a music index indicating that the generated musical composition is recognizable as music, while also producing a novelty index indicating the generated musical composition is not within a known style for existing musical compositions.

DETAILED DESCRIPTION

The method disclosed herein is at least partially motivated from a theory suggested by Daniel. E. Berlyne (1924-1976), as set forth in "Arousal and reinforcement", *Nebraska symposium on motivation*, University of Nebraska Press, 1967; and "Aesthetics and psychobiology", Volume 336, *JSTOR*, 1971. Berlyne noted that the psychophysical concept of "arousal" has a great relevance for studying aesthetic phenomena. The "level of arousal" measures how alert or excited a human being is. The level of arousal varies from the lowest level, when a person is asleep or relaxed, to the highest level when s/he is violent, in a fury, or in a passionate situation. External stimulus patterns are one of the mechanisms of arousal, and are of particular importance and relevance to art.

The term "arousal potential" refers to the properties of stimulus patterns that lead to raising arousal. Besides other psychophysical and ecological properties of stimulus patterns, Berlyne emphasized that the most significant arousal-raising properties for aesthetics are novelty, surprisingness, complexity, ambiguity, and puzzlingness. He coined the term "collative variables" to refer to these properties collectively.

Novelty refers to the degree a stimulus differs from what an observer has seen/experienced before. Surprisingness refers to the degree a stimulus disagrees with expectation. Ambiguity refers to the conflict between the semantic and syntactic information in a stimulus. Puzzlingness refers to the ambiguity due to multiple, potentially inconsistent, meanings.

People prefer stimulus with a moderate arousal potential. Too little arousal potential is considered boring, and too much stimulus activates the aversion system, which results in negative response. Of particular importance in art is habituation, which refers to decreased arousal in response to repetitions of a stimulus.

Habituation is important in the field of art. If artists keep producing similar works of art, the arousal potential of such art is reduced, and the desirability of that art is also reduced. Therefore, at any point of time, artists will try to increase the arousal potential of art that they produce. In other words, habituation forms a constant pressure to change art. However, this increase has to be tempered, as stimuli that are slightly different, rather than vastly supernormal, are preferred.

The present invention provides a system and method for generating novel creative works of art applicable to any domain of artistic forms and expressions where the creative products can be digitized and manipulated in digital format. This includes visual artistic forms such as paintings, graphic designs, fashion designs, jewelry designs, sculpture, image sequence (moving picture), and other forms of art and designs. In any of these forms, the analog content can be converted to a digital format (digitized) using a 2-dimensional scanner for planar objects like paintings, or a 3-dimensional scanner for 3D objects like statues. Two-dimensional scanners include optical scanners and cameras. Three-dimensional scanners include stereo cameras, laser scanners, time of flight cameras, structure light cameras, and methods that capture object shapes using structure from motion technology or combining multiple views of the object using computer vision multi view geometry.

The system is also applicable to auditory forms such as music where the content can be digitized and encoded using frequency analysis (spectrograms) or using music transcription methods. This system is also applicable to creative products that are originally created in digital format (born digital) such as computer graphic art, digital art, digitally generated music, etc. Therefore, as used herein, the words and phrases "art", "works of art", artwork" and "artworks" should be understood mean creative products in any of the aforementioned domains including paintings, graphic designs, fashion designs, jewelry designs, sculptures, image sequences (moving picture), music, and other forms of art and designs. It should be understood that the description herein using paintings as a form of artworks is only illustrative of the present disclosure. In any of the aforementioned domains, the input to the system is a dataset extensively sampling prior human-generated artworks in that domain comprising the historical prior work in that domain.

In practicing the present invention, various embodiments thereof provides an art-generating system and method using a deep neural network that is a modified form of a Generative Adversarial Network, or GAN. GANs have become one of the most popular image synthesis models. A GAN is typically trained by effectively "playing" a game between two players. The first player, called the generator, G, generates samples that are intended to come from the same probability distribution as a set of training data, but without having access to such training data. The other player, denoted as the discriminator, D, examines the samples to determine whether they are coming from the training data (i.e., they are real) or not (they are fake). Both the discriminator and the generator are typically modeled as deep neural networks. The training procedure is similar to a two-player min-max game with the following objective function:

$$\min_G \max_D V(D, G) = \quad \text{(Equation 1)}$$
$$E_{x \sim pdata}[\log D(x)] + E_{z \sim pz}[\log(1 - D(G(z)))]$$

where z is a noise vector sampled from distribution $p_z$ (e.g., uniform or Gaussian distribution) and x is a real image from the data distribution $p_{data}$. In practice, the discriminator and the generator are alternatively optimized for every batch. The discriminator aims at maximizing Equation 1 above by minimizing the expression below:

$$-E_{x \sim pdata}[\log D(x)] - E_{z \sim pz}[\log(1 - D(G(z)))],$$

which improves the utility of the D as a fake vs. real image detector. Meanwhile, the generator aims at minimizing Equation 1 above by maximizing the term $\log(D(G(z)))$, which works better than $-\log(1-D(G(z)))$, since it provides stronger gradients. By optimizing D and G alternatively, GAN systems are trained to generate images that emulate the training data distribution.

In contrast, various embodiments of the system and method disclosed herein generates art with increased levels of arousal potential in a constrained way without activating the aversion system of a viewer. In other words, the system generates artworks that are novel, but not too novel. This criterion it is not easy to achieve, since it is not obvious to find a way to achieve that goal given the infinite possibilities in the creative space. Various embodiments of the invention create and store training information based upon existing works of art created by humans. This training information can be continuously updated with the addition of new art that becomes available from current artists. The embodiments of the invention disclosed herein use this stored training information in an indirect way while generating new art with a restrained increase in arousal potential. There are several ways to increase such arousal potential, including novelty, surprisingness, complexity, ambiguity, and puzzlingness.

Various embodiments of the invention described herein focus upon increasing the stylistic ambiguity and deviations from style norms, while at the same time, avoiding movement too far away from what is commonly accepted as art. The system and method described herein allows one to explore the creative space by deviating from the established style norms and thereby generate new works of art. Styles of art can be encoded using semantic style labels describing certain art movements, such as "impressionist" or "cubist" style. Artistic style can also be defined using discrete or continuous time periods, such as 19th century style. The rationale for considering novelty is that creative human artists eventually break from established styles and explore new ways of expression to increase the arousal potential of their art. Creators often work within a very structured domain, and it often takes considerable time for artists to break free from following established rules.

The method and system of the present invention, as included in various embodiments described herein, are designed to generate art that does not follow established art movements or styles, but instead generates art that will confuse human viewers as to which style or form of art it belongs. Arousal potential can also be quantified in terms of novelty. Surprisingness refers to the degree a stimulus disagrees with expectation, which is quantified using the concept of information content from information theory. Unlike novelty and surprisingness which rely on interstimulus comparisons of similarity and differences, complexity is an intra-stimulus property that increases as the number of independent elements in a stimulus grows. Complexity is quantified using intra-stimulus entropy and/or self-correlation measures. Semantic ambiguity refers to the conflict between the semantic and syntactic information in a stimulus. Puzzlingness refers to the ambiguity due to multiple, potentially inconsistent, meanings. Semantic ambiguity and puzzlingness are quantified by measuring the entropy of the output of object classifier or genre classifier.

Figure 1:
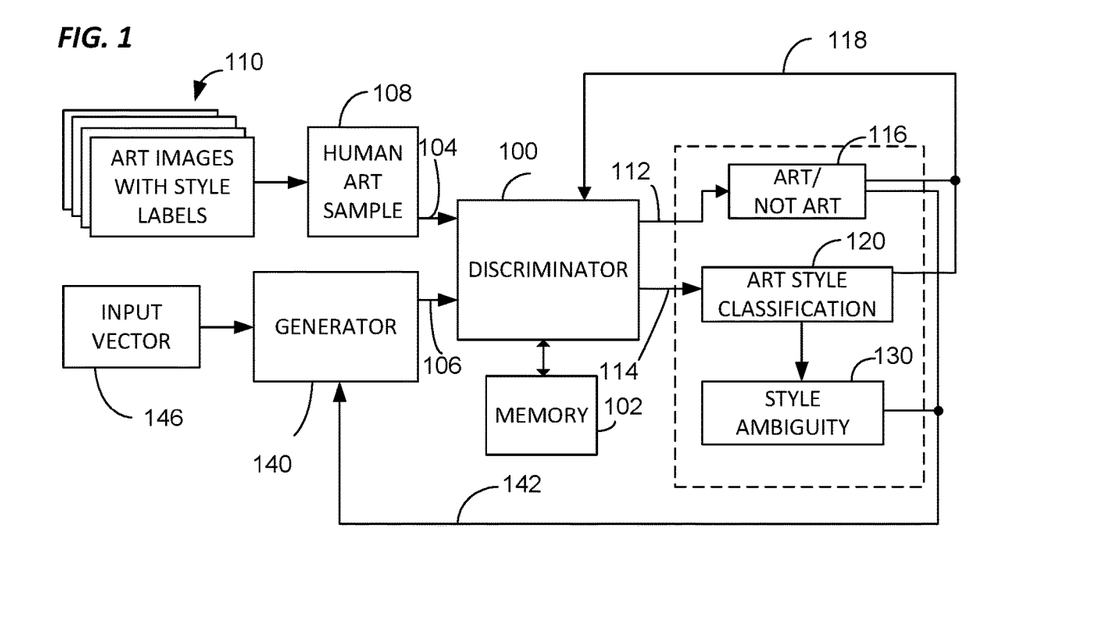
FIG. 1 is a block diagram of a system for generating art deviating from style norms in accordance with various embodiments of the present invention.

In the block diagram of FIG. 1, a discriminator 100 is formed as a computer model on a general purpose computer, which includes memory 102. Discriminator 100 includes two input ports 104 and 106. Input port 104 is coupled to human art sample block 108, which may represent a camera or scanner for supplying digitized data to discriminator 100. In turn, block 108 is coupled to art source blocks 110 which represent existing works of art created in the past by humans. Each such work of art included in source blocks 110 may include a label associated therewith. These labels may, for example, designate a particular art style associated with each such work. Alternatively, such labels may characterize the content of each such work, including scenes, objects, or people depicted in each such work.

In order to "train" the system, all of the works of art, and each of their associated labels, included in source blocks 110, are passed through block 108 for presentation as digitized data to discriminator 100. Discriminator 100 has two output nodes 112 and 114. Output node 112 is coupled to block 116, labeled "Art/Not Art", which provides an art index value. The art index value varies along a range from, e.g., a high value indicating that a work has a high degree of recognized artistic elements, to a low value indicating that a work has a significant absence of recognized artistic elements. This art index value is fed back to discriminator 100 by data bus 118. During "training", art index values are purposely configured to a high value, since discriminator 100 is analyzing an existing known work of actual art.

Node 114 is coupled to Art Style Classification block 120 for receiving style label information associated with the current art sample being analyzed. The art style information might correspond, for example, to Expressionism, Abstract-Expressionism, Action-Painting, Color-Field-Painting, Minimalism, Cubism, Analytical-Cubism, Synthetic-Cubism, Naive Art-Primitivism, Art-Nouveau-Modern, Realism, Contemporary-Realism, New-Realism, Baroque, Early-Renaissance, High-Renaissance, Northern-Renaissance, Pointillism, Pop-Art, Impressionism, Post-Impressionism, Rococo, Fauvism, or Romanticism, to name a few. The output from block 120 is also sent along bus 118 back to discriminator 100.

Art style classification box 120 also provides its output to style ambiguity box 130. During "training", there is no "ambiguity", since each work of art analyzed by discriminator 100 includes a pre-assigned label characterizing the work as being of one type of style or another. Style ambiguity box 130 provides an output value that is relatively low (zero) when the style of the work is clearly recognized, and provides an output value that is relatively high when the style of the work being analyzed does not correspond well to one of the style types provided during "training". The output of style ambiguity block may be viewed as one example of a novelty index for rating the novelty of a work under analysis. Again, during "training", none of the works are regarded as being novel.

When "training" has been completed, i.e., when all of the works of art in source blocks 110 have been input to discriminator 100, memory 102 has accumulated a wealth of data regarding artistic elements that are commonly present in existing works, as well as the particular styles of works that typically include those respective artistic elements.

Still referring to FIG. 1, generator 140, which may be a graphics processing unit, is provided to generate an image that may ultimately serve as a work of art. The output of generator 140 is provided to input 106 of discriminator 100. Generator 140 is also coupled to a data bus 142 for receiving feedback information from blocks 116 and 130. Generator 140 is also coupled to input vector block 146 for receiving randomized input vectors that initially drive the image created by generator 140.

Based upon input vectors provided by block 146, generator 140 initially produces a randomized image at its output 106 to discriminator 100. Discriminator 100 then analyzes the image presented by generator 140 in at least two ways. First, discriminator 100 looks for patterns resembling artistic elements that discriminator 100 found in existing works of art during training. Secondly, discriminator 100 compares any such artistic elements that are present in the generated work to artistic elements known to be associated with particular styles of works that were analyzed during training.

During a first iteration, and perhaps during the first fifty iterations of images generated by generator 140, it is likely that block 116 will produce a very low "art index", indicating that few, if any, artistic elements were found to be present in the generated work. The output of block 116, the "art index", is provided over data bus 142 to generator 140, and in response, generator 140 modifies the most-recently generated image to "try again". Slowly, but eventually, the art index provided by block 116 will increase, by finding a greater number of artistic elements and patterns in the generated work. If desired, this iterative process can be stopped before the art index becomes too high in value, particularly if the objective is to generate works that are novel. On one hand, the generated work should include enough recognizable artistic elements that a viewer will consider the work to be "artistic". While it is desired to generate novel artwork, the resulting work of art should not be "too novel", or it will generate too much arousal, thereby activating the viewer's aversion system. 3) the generated work should increase the stylistic ambiguity.

The other signal fed back to generator 140 is the novelty index, or style ambiguity rating generated by block 130. One way of ensuring that the generated work of art is novel is to create a work that does not clearly match known art styles on which the system has already been trained. In the first iteration of the image generated by generator 140, the novelty index will almost certainly be relatively high since the initially generated image will not have any artistic elements that resemble any known art style. However, after many iterations, it could be the case that generator 140 is producing an image that not only has recognized artistic elements, but also has a number of particular artistic elements that are typically found in a particular style of art. If the objective is to create novel art, then generator 140 needs to be steered away from producing a work that fits closely within a known style of art encountered during "training". Thus, by feeding the output of block 130 onto data bus back to generator 140, generator 140 can make modifications to retain enough novelty to have an ambiguous art style, i.e., to have a style that is not easily classified within one or more known art styles.

The system shown in FIG. 1 includes two "adversary networks", discriminator 100 and generator 140. Discriminator 100 has access to a large set of art (110) associated with style labels (Renaissance, Baroque, Impressionism, Expressionism, etc.) and uses it to learn to discriminate between styles. On the other hand, generator 140 does not have access to any pre-existing art; it generates art starting from a random input. Unlike a conventional Generative Adversarial Network, or GAN, generator 140 receives two signals from discriminator 100 for each work it generates. The first signal is the discriminator's classification of "art or not art", i.e., the "art index" supplied by block 116. In a traditional GAN, this signal enables the generator to change its weights to generate images that are more likely to fool discriminator 100 as to whether such generated image is an actual work of art created by a human. In a conventional GAN, this is the only signal received by the generator from the discriminator, which essentially compels the generator to eventually converge to generate images that will emulate known works of art.

In contrast to a conventional GAN, generator 140 receives a second signal, provided by block 130, indicating whether, and to what extent, discriminator 100 can classify the generated image into one or more established styles. If generator 140 generates an image that discriminator 100 thinks to be art, and if discriminator 100 can also easily classify the generated image into one of the art styles that were established during training, then generator 140 would have fooled discriminator 100 into considering the generated image as being actual existing art that fits within an established art style. In contrast, the system of FIG. 1 is configured to "fool" the discriminator to consider the generated image to be "art," but causes discriminator 100 to conclude that the style of the generated work is ambiguous.

The art index signal provided by block 116 and the style ambiguity (or novelty) signal provided by block 130 are contradictory forces, because the art index signal pushes generator 140 to generate works that discriminator 100 accepts as "art," but the style ambiguity signal will pushes generator 140 to generate style-ambiguous works. Therefore, these two signals, working together, cause generator 140 to better explore parts of the creative space that lie close to recognizable art while increasing the ambiguity of the generated art with respect to how it fits in the realm of standard art styles.

Figure 2:
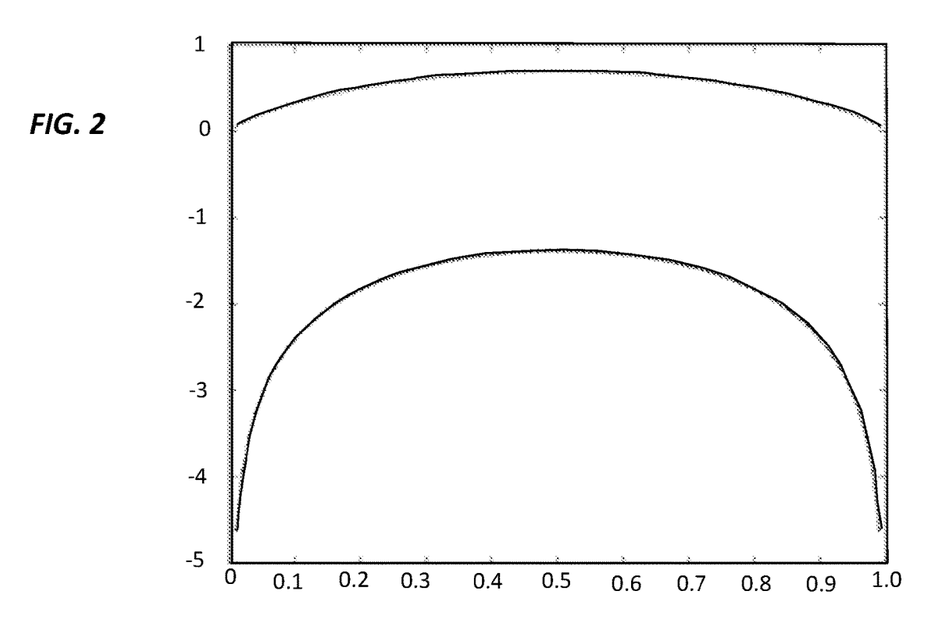
FIG. 2 is a graphical representation of a style ambiguity cross entropy loss function.

Still referring to FIG. 1, it has been mentioned above that block 130 provides a signal representing style ambiguity. Style ambiguity can be increased by maximizing the style class posterior entropy. In mathematical terms, this is equivalent to making generator 140 produce an image $x \sim p_{data}$ while maximizing the entropy of $p(c|x)$ (i.e., the style class posterior) for the generated images. However, instead of maximizing the class posterior entropy, one may instead minimize the cross entropy between the class posterior and a uniform target distribution. Similar to entropy that is maximized when the class posteriors (i.e., p(c|G(z))) are equiprobable, cross entropy with uniform target distribution will be minimized when the classes are equiprobable. So both objectives will be optimal when the classes are equiprobable. FIG. 2 is a graph that shows the style ambiguity cross entropy loss function. In FIG. 2, the upper curve shows entropy, while the lower curve shows cross entropy with a uniform distribution (inverted for purposes of illustration). As shown in FIG. 2, the cross entropy curves sharply toward negative infinity at the boundary if any class posterior approaches 1 (or zero), while entropy goes to zero at this boundary condition. Therefore, one may use the cross entropy to signal that the generated image can be easily classified into one of the art style classes which discriminator 100 learned during training. This in turn would generate a very large loss, and hence, large gradients, if the generated image closely resembles one of the trained art style classes.

Hence, we can redefine the loss function of the system, now with a different adversarial objective, as follows:

$$\min_G \max_D V(D, G) = \mathbb{E}_{x,\hat{c} \sim p_{data}}[\log D_r(x) + \log D_c(c = \hat{c} \mid x)] +$$ (Equation 2)

$$E_{z \sim pz}\left[\log(1 - D_r(G(z))) - \sum_{k=1}^{K}\left(\frac{1}{K}\log\Big(D_c(c_k \mid G(z)) + \left(1 - \frac{1}{K}\right)\log(1 - D_c(c_k \mid G(z)))\right)\right]$$

where z is a noise vector sampled from distribution $p_z$ (e.g., uniform or Gaussian distribution) and x and $\hat{c}$ are a real image and its corresponding style label from the data distribution (or training data) $p_{data}$. $D_r(\bullet)$ is the transformation function that tries to discriminate between real art and generated images. $D_c(\bullet)$ is the function that discriminates between different style categories and estimates the style class posteriors (i.e., $D_c(ck|\bullet)=p(c_k|\bullet)$).

In reference to Equation 2 above, discriminator 100 encourages maximizing Equation 2 by minimizing the term $-\mathbb{E}_{x \sim pdata}[\log D_r(x) + \log D_c(c=\hat{c}|x)]$ for the real images of actual existing artwork, and minimizing the expression $-\mathbb{E}_{z \sim pz}[\log(1-D_r(G(z)))]$ for the generated images. Discriminator 100 is trained not only to discriminate the real art samples from the generated (fake) ones, but also to identify their style class though the K-way loss (where K is the number of style classes). Therefore, discriminator 100 is simultaneously learning about both the art distribution (artistic elements) and art styles (style classifications).

Generator 140 encourages minimizing Equation 2 by maximizing the expression $$D_r(G(z)) - \sum_{k=1}^{K}\left(\frac{1}{K}\log\Big(D_c(c_k \mid G(z)) + \left(1 - \frac{1}{K}\right)\log(1 - D_c(c_k \mid G(z))\right).$$

In the expression above, the first term, $D_r(G(z))$, corresponds the resemblance of the generated image to real art, and the second term (i.e., the summation from k=1 through K) corresponds to degree of style ambiguity. This pushes the generated images to look more like real art (first term), but also to have a large cross entropy for p(c|G(z)) with a uniform distribution to maximize style ambiguity (second term).

One example of a training process that may be used to train generator 140 can be represented by the computer instruction steps listed below (with step size a, using mini-batch SGD for simplicity):

| | |
|---|---|
| 1: | Input: mini-batch images x, matching label ĉ, number of training batch steps S |
| 2: | for n = 1 to S do |
| 3: | z ~ N(0,1)$^Z$ {Draw sample of random noise} |
| 4: | x̂ ← G(z) {Forward through generator} |
| 5: | $s_D^r$ ← $D_r(x)$ {real image, real/fake loss} |
| 6: | $s_D^c$ ← $D_c(\hat{c}\|x)$ {real image, multi class loss} |
| 7: | $s_G^f$ ← $D_r(\hat{x})$ {fake image, real/fake loss} |
| 8: | $s_a^c \leftarrow \sum_{k=1}^{K} \frac{1}{K}\log(p(c_k \mid \hat{x})) + \left(1 - \frac{1}{K}\right)(\log(p(c_k \mid \hat{x}))$ |
| 9: | $L_D$ ← log($S_D^r$) + log(1 − $s_G^f$) |
| 10: | D ← D − α∂LD/∂D {Update discriminator} |
| 11: | $L_G$ ← log($s_G^f$) − $s_G^c$ |
| 12: | G ← G − α∂LG/∂G {Update generator} |
| 13: | end for |

For generator 140, the first z∈R100 normally sampled from 0 to 1 is up-sampled to a 4× spatial extent convolutional representation with 2048 feature maps resulting in a 4×4×2048 tensor. Then a series of four fractionally-stride convolutions are derived. Finally, this high level representation is converted into a 256×256 pixel image. In other words, starting from z∈R100, a 4×4×1024 image is created, then converted to an 8×8×1024 image, then converted to a 16×16×512 image, then converted to a 32×32×256 image, then to a 64×64×128 image, then to a 128×128×64 image, and finally to a 256×256×3 generated image size.

In the example described above, discriminator 100 has two types of losses, namely, real/fake loss and multi-label loss. Discriminator 100 starts with a common body of convolution layers followed by two heads (one for the real/fake loss and one for the multi-label loss). The common body of convolution layers is composed of a series of six convolution layers (all with stride 2 and 1 pixel padding), as follows:

conv1 (32 4×4 filters)
conv2 (64 4×4 filters)
conv3 (128 4×4 filters)
conv4 (256 4×4 filters)
conv5 (512 4×4 filters)
conv6 (512 4×4 filters).

Each of the above-listed convolutional layers may be followed by a leaky rectified activation (LeakyRelU) in all the layers of the discriminator. Such leaky-rectified activation layers are described, for example, in Maas, et al., "Rectifier nonlinearities improve neural network acoustic models", *In Proc. ICML*, volume 30, 2013; and Xu, et al., "Empirical evaluation of rectified activations in convolutional network", *arXiv preprint arXiv*: 1505.00853, 2015. After passing a image to the common cony D body, it will produce a feature map of size 4×4×512. The real/fake $D_r$ head collapses the 4×4×512 feature map to produce $D_r(c|x)$ (probability of image being sourced from real artwork). The multi-label probabilities $D_c(c_k|x)$ head is produced by passing the 4×4×512 feature map into 3 fully collected layers sizes 1024, 512, K, respectively, where K is the number of style classes.

Referring again to the example training process set forth above for training generator 140, as exemplified by the computer instructions listed earlier, the weights were initialized from a zero-centered Normal distribution with standard deviation 0.02. A mini-batch size of 128 was used. For training purposes, a mini-batch stochastic gradient descent (SGD) was used, with a learning rate of 0.0001. In the LeakyReLU, the slope of the leak was set to 0.2 in all models. Others who have employed a conventional GAN have used momentum to accelerate training. The applicant has found that use of an "Adam optimizer" can be advantageous, particularly if the model is trained for 100 epochs (i.e., 100 passes over the training data). To stabilize the training, the Batch Normalization process described in Ioffe, et al., "Batch normalization: Accelerating deep network training by reducing internal covariate shift", *arXiv preprint arXiv:* 1502.03167, 2015 may be used to normalize the input to each unit to have zero mean and unit variance. Data augmentation may be performed by adding five crops for each image (bottom-left, bottom-right, mid, top-left, top-right) within the image dataset. The width and height of each crop is 90% of the width and the height of the original painting.

Those skilled in the art will appreciate that the network training process described above is only one example that may be successfully employed. Other GAN training protocols and modeling methods already known to those skilled in the art for implementing a generative adversarial network, including its discriminator and generator, may also be used, if desired, to achieve the objectives of the present invention.

Figure 3:
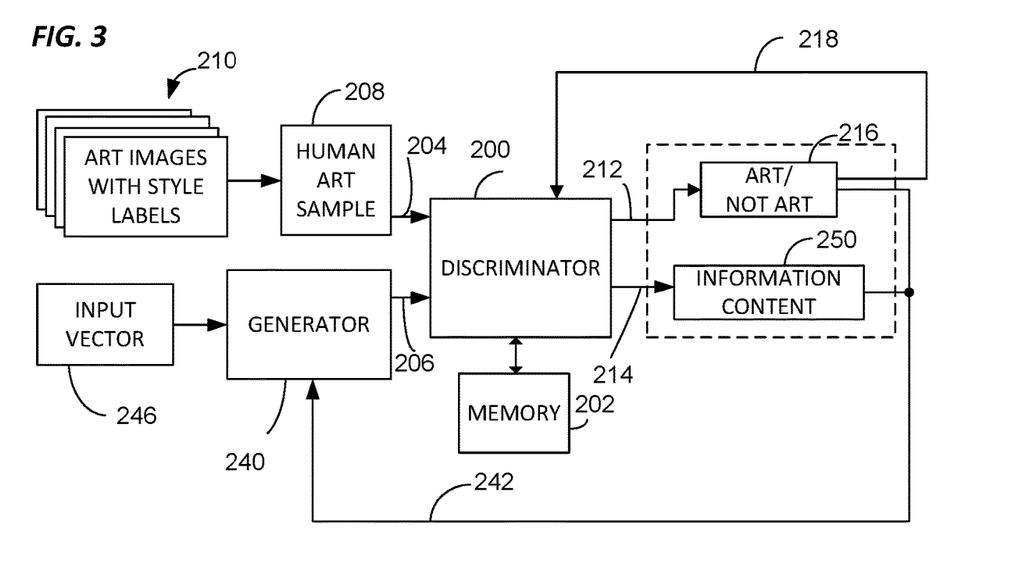
FIG. 3 is a block diagram of a system for generating art that maximizes surprisingness arousal in accordance with various embodiments of the present invention.

Turning to FIG. 3, the model described above in reference to FIG. 1 can be modified to realize a variant model that maximizes the "surprisingness" of the generated art as a force which opposes the "art/not art" factor in the loss function. Elements within FIG. 3 that correspond with like elements in FIG. 1 have been labeled with similar reference numerals. The primary difference between the system of FIG. 3 compared with the system of FIG. 1 is that a) the labels associated with the art images in source files 210 provide information regarding information content in the existing works of art, rather than characterizing the art style of such works, and b) discriminator 200 provides information to block 250 regarding perceived content of an image rather than providing information regarding the style of the work.

The output signal of Information Content block 250 provides a ranking ranging from a low value (indicating content is recognized) and a high value (indicating that content is highly ambiguous, or novel. Both the art index generated by block 216 and the novelty index generated by block 250 are provided by data bus 242 to generator 240. The output of block 250 pushes generator 240 to generate samples that are on the boundary of the training samples instead of emulating the trained art. This is achieved by measuring the information content in the generated samples, and generating a surprisingness value, using Shannon information theory measure, as:

$$\text{surprisingness}(x) = I(x|M) = -\log(x|M)$$

where M is the discriminator memory, or a representative sample thereof approximating the content distribution of the trained samples.

Figure 4:
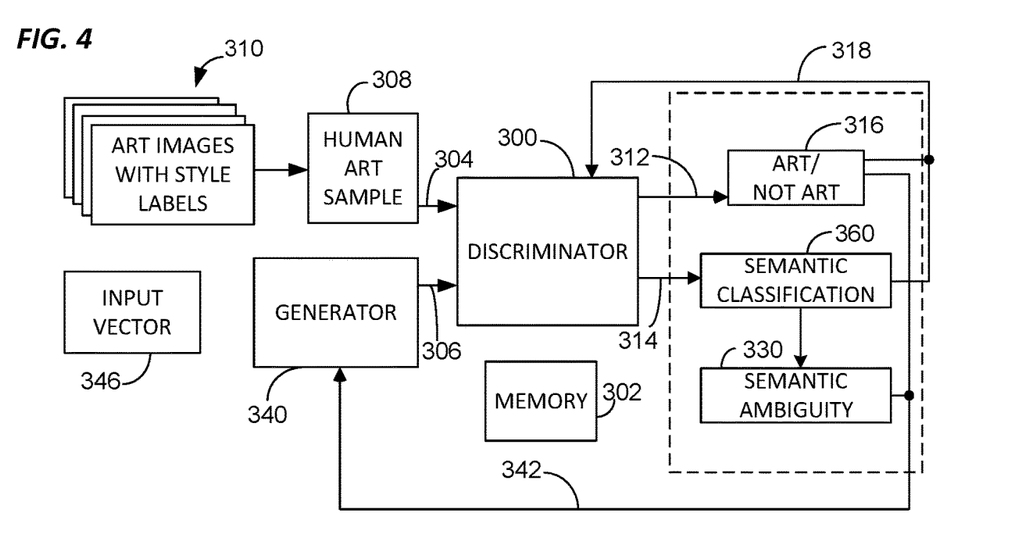
FIG. 4 is a block diagram of a system for generating art that maximizes semantic ambiguity in accordance with various embodiments of the present invention.

FIG. 4 shows another variant of the block diagram of FIG. 1, this time for maximizing the semantic ambiguity and/or puzzlingness of the generated art as the force opposing the "art/not art" index in the loss function. Elements within FIG. 3 that correspond with like elements in FIG. 1 have been labeled with similar reference numerals. The primary difference between the system of FIG. 4 compared with the system of FIG. 1 is that a) the labels associated with the art images in source files 310 provide information regarding semantic information relative to each of the existing works of art, rather than characterizing the art style of such works, and b) discriminator 200 provides information to block 360 regarding perceived semantic classification of an image rather than providing information regarding the style of the work.

The system of FIG. 4 pushes generator 340 to explore parts of the space that create semantically surprising art. This is realized using semantic classifier 360 at discriminator 300 where it learns to classify art according to specific semantic labels. These semantic labels can be a set of object classes expected to be seen in art images, or a set of subject matters, or a set of genres. A semantic ambiguity term, provided by block 330, can be realized using cross-entropy among the semantic classes similar to the case of stylistic ambiguity.

An embodiment of the present invention was tested to validate the concepts described herein. For purposes of training the system, paintings from the publicly available "WikiArt" dataset found at www.wikiart.org. This collection (as downloaded in 2015) included images of 81,449 paintings from 1,119 artists ranging from the Fifteenth century to Twentieth century. The listing below shows the number of images from each style used in training the model:

| Style name | Number of Images |
|---|---|
| Abstract-Expressionism | 2,782 |
| Action-Painting | 98 |
| Analytical-Cubism | 110 |
| Art-Nouveau-Modern | 4,334 |
| Baroque | 4,241 |
| Color-Field-Painting | 1,615 |
| Contemporary-Realism | 481 |
| Cubism | 2,236 |
| Early-Renaissance | 1,391 |
| Expressionism | 6,736 |
| Fauvism | 934 |
| High-Renaissance | 1,343 |
| Impressionism | 13,060 |
| Mannerism-Late-Renaissance | 1,279 |
| Minimalism | 1,337 |
| Naive Art-Primitivism | 2,405 |
| New-Realism | 314 |
| Northern-Renaissance | 2,552 |
| Pointillism | 513 |
| Pop-Art | 1,483 |
| Post-Impressionism | 6,452 |
| Realism | 10,733 |
| Rococo | 2,089 |
| Romanticism | 7,019 |
| Synthetic-Cubism | 216 |
| Total | 75,753 |

Images were then generated according to three different baseline models, and assessed for artistic merit by human evaluators. In the first baseline model, the images were generated with 64×64 resolution. However, it was found that this model failed to generate images that emulate the trained art, i.e., the generated samples did not show any recognizable figures or art genres or styles.

Using the second baseline model, two more "layers" were added to the generator to increase the resolution of the generated images to 256×256. In this case, the generated samples showed significant improvement; human evaluators could clearly see aesthetically appealing compositional structures and color contrasts in the resulting images. However, the generated images did not show any recognizable figures, subject matters or art genres.

The third baseline model included style classification loss function, but not the style ambiguity loss function. In this model, the discriminator learns to discriminate between style classes as it is trained on the images associated with those art styles. The generator applied exactly the same loss as the discriminator model; in other words, the generator was merely trying to deceive the discriminator by emulating works of art already encountered during training. In the case of the third baseline model, unlike the two first baselines that merely respond to the "art/not art" index, this model also learn about styles classes in art. This third baseline model can be referred to as "style-classification-CAN", where CAN designates "Creative Adversarial Networks", as contrasted with GAN ("Generative Adversarial Networks"). The generated images of this model showed significant improvement in actually emulating the trained art distribution; human evaluators could identify "hallucinations" of portraits, landscapes, architectures, religious subject matter, etc. This third baseline model demonstrated that the style-classification-CAN model (without using the style ambiguity loss function) could better emulate the trained art distribution by learning about style classes. However, the generated images did not have a high degree of creativity.

After running the first three baseline models, as described above, an embodiment of the present invention as represented and described in regard to FIG. 1 was used, including the style ambiguity loss function. The generated images were then ranked for artistic merit by human evaluators. In contrast to the aforementioned three baseline models, the embodiment represented in FIG. 1 generated images that could be characterized as novel and not emulating the trained art distribution, and yet still aesthetically appealing. The generated images of the CAN model (using the style ambiguity loss function) do not show typical figures, genres, styles, or subject matter, since the style ambiguity loss forces the network to try to generate novel images while retaining artistic elements learned from the training art distribution, and thereby being aesthetically appealing.

Human subject experiments were conducted to evaluate aspects of the creativity of the CAN model. The goal of such experiments was to test whether human subjects could tell whether the CAN-generated images were generated by a human artist or by a computer system, and to determine whether the CAN-generated images were regarded as having artistic merit. All generated images were upscaled to 512× 512 resolution using a superresolution algorithm. In many instances, human evaluators found that works generated by the embodiment shown in FIG. 1 were more likely to have been produced by a human artist than some of the actual existing works used to train the model, and in several cases, the human evaluators liked the computer generated images produced by the embodiment shown in FIG. 1 more than similar images created by real artists. In this regard, human evaluators found the images generated by the system of FIG. 1 to be intentional, visually structured, communicative, and inspiring, with similar levels to actual human art. These results indicate that the human evaluators see these computer-generated images as art!

A separate experiment was conducted to evaluate the effect of adding the style ambiguity loss to the CAN model, in contrast to the style classification loss, for purposes of generating novel and aesthetically appealing images. One of the objectives of the experiment was to try to determine whether the basis for creativity (novelty) in the CAN model comes from the mere learning about art styles, or whether such creativity comes from intentional deviation from known art styles? To assess creativity, the novelty of the generated images was explored with a pool of art history students; such sophisticated art-educated students are well-adapted to judge the novelty and aesthetics of computer generated images. Each subject was shown pairs of images, one generated by CAN including use of the style ambiguity loss function, and one generated by CAN using the style classification loss function, but omitting the style ambiguity loss function. The respective paired images were randomly selected and placed in random order side by side. Human evaluators were asked, regarding the paired images, which image was regarded as being more novel, and which image was regarded as being more aesthetically appealing.

The results of this experiment showed that 59.47% of the time, the human evaluators selected the CAN images (generated using the style ambiguity indicator loss function) as being more novel. Also, the results showed that 60% of the time, the human evaluators selected the CAN images (generated using the style ambiguity indicator loss function) as being more aesthetically appealing. These results are believed to indicate that use of the style ambiguity loss function in the process of generating images using CAN serves to increase novelty of the generated works without sacrificing artistic appeal.

Figure 5:
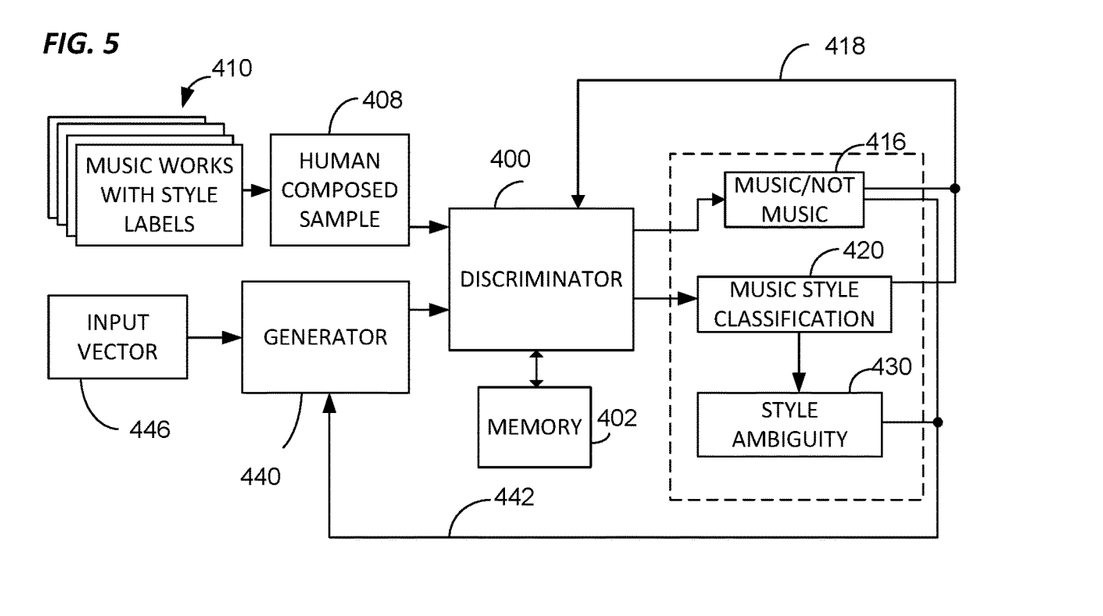
FIG. 5 is a block diagram of a system for generating musical compositions deviating from style norms in accordance with various embodiments of the present invention.

FIG. 5 is a block diagram of a similar CAN system but directed to the creation of novel musical compositions and/or audible works, rather than visual works. However, the general operation of the system shown in FIG. 5 is virtually the same as for the system of FIG. 1, and like components are identified by similar reference numerals. A source of existing musical works 410 are individually provided to block 408 for input to discriminator 400 for training purposes, including style labels associated with each such work. Discriminator 400 "learns" that each of the source works is actual music, and the style of music in which such work is classified. Following training, generator 440, which may be a form of music synthesizer or audio generator, is initially driven by random input vector block 446 to generate a series of random sounds, notes, and/or chords for presentation to discriminator 400. Block 416 ranks the generated composition on the music/non-music scale, and style ambiguity block 430 ranks the generated composition for music style ambiguity. These "music/non-music" and "music style ambiguity" rankings are provided on data bus 442 to generator 440 for modifying the next iteration of the generated musical composition. After a number of iterations, the generated musical composition will include recognizable musical elements, but will have a relatively high degree of novelty compared to existing musical compositions produced by human composers. It should be understood that remarks made herein with regard to works of art may include musical compositions as well.

Those skilled in the art should now appreciate that a method and system for generating art with creative characteristics has been disclosed based upon a novel creative adversarial network, or CAN. The system is first trained using a large collection of art images with style labels (or, alternatively, with other labels characterizing the type of artwork). The system is then able to generate art by optimizing a criterion that stays close to commonly-recognized artistic elements, while increasing stylistic ambiguity. Images generated by using Applicant's method and system were sometimes mistaken by human subjects as having been generated by human artists, and were sometimes found to be relatively more appealing than works created by human artists. All machine learning applied herein is based solely on exposure to art and concepts of art styles. The system has the ability to continuously learn from new training art and would then be able to adapt its generation based on what it learns.

Several embodiments are specifically illustrated and/or described herein. However, it will be appreciated that modifications and variations are covered by the above teachings and within the scope of the appended claims without departing from the spirit and intended scope thereof. It should be understood that the description, and specific embodiments, discussed herein are merely illustrative of the present invention. Various modifications or adaptations of the methods described may become apparent to those skilled in the art and/or devised by those skilled in the art without departing from the disclosure. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. The present disclosure is intended to embrace all such alternatives, modifications and variances. The embodiments described are presented only to demonstrate certain examples of the disclosure. Other elements, steps, methods, and techniques that are insubstantially different from those described above and/or in the appended claims are also intended to be within the scope of the disclosure.

I claim:

1. A method for generating art comprising the steps of:
   a) providing to a computer a set of digitized data characterizing a plurality of existing works of art created by human beings, the digitized data including the designation of a style associated with each such existing work of art, the computer including a memory;
   b) using the computer to analyze the digitized data and corresponding style designations, including recognition of artistic elements in the existing works of art, and creating art recognition data associating particular artistic elements of existing works of art with particular style designations;
   c) storing the art recognition data in the memory of the computer
   d) providing a graphics processing unit to generate a graphic image;
   e) providing the generated graphic image generated by the graphics processing unit to the computer;
   f) using the computer to compare the generated graphic image to the stored art recognition data;
   g) based upon such comparison, providing an art index which ranks the generated graphic image along a scale that ranges from being recognizable as art and not being recognizable as art;
   h) based upon such comparison, providing a novelty index which ranks the generated graphic art along a scale that ranges from being within a known style for existing works of art and not being within a known style for existing works of art;
   i) modifying the generated graphic image based upon the art index and the novelty index;
   j) repeating steps f) through i) until the generated graphic image produces an art index indicating that the generated graphic image is recognizable as art, while also producing a novelty index indicating the generated graphic image is not within a known style for existing works of art.

2. The method recited by claim 1 wherein such method is an iterative enhancement process.

3. The method recited by claim 1 wherein the generated graphic image reached after performing such iterative enhancement process is rendered in a tangible medium.

4. The method recited by claim 1 wherein the set of digitized data comprises a plurality of paintings fixed on tangible medium.

5. The method recited by claim 1 wherein the set of digitized data comprises a plurality of sculptures fixed on tangible medium.

6. The method recited by claim 1 wherein the set of digitized data comprises a plurality of image sequences.

7. The method recited by claim 1 wherein the set of digitized data comprises a plurality of graphical designs.

8. The method recited by claim 1 wherein the set of digitized data comprises a plurality of fashion designs.

9. The method recited by claim 1 wherein the set of digitized data comprises a plurality of consumer product designs.

10. The method recited by claim 1 wherein the step of using the computer to analyze the digitized data includes the use of a neural network.

11. A computerized system for generating art comprising in combination:
    a) a computer for receiving a set of digitized data characterizing a plurality of existing works of art created by human beings, the digitized data including the designation of a style associated with each such existing work of art;
    b) an electronic memory coupled to the computer;
    c) the computer analyzing the digitized data and corresponding style designations, including recognition of artistic elements in the existing works of art, and creating art recognition data associating particular artistic elements of existing works of art with particular style designations for storage in the electronic memory;
    d) a graphics processing unit coupled to the computer for generating a graphic image, and presenting such graphic image to the computer;
    f) the computer comparing the generated graphic image to the stored art recognition data, and the computer providing an art index which ranks the generated graphic image along a scale that ranges from being recognizable as art and not being recognizable as art, the computer also providing a novelty index which ranks the generated graphic art along a scale that ranges from being within a known style for existing works of art and not being within a known style for existing works of art;
    g) the graphics processing unit receiving information associated with the art index and the novelty index, and being responsive thereto to generate a modified graphic image for presentation to the computer;
    whereby the graphics processing unit repeatedly presents modified graphic images to the computer until a final modified graphic image presented thereby to the computer produces an art index indicating that the generated graphic image is recognizable as art, while also producing a novelty index indicating the generated graphic image is not within a known style for existing works of art.

12. The computerized system recited by claim 11 further including a printer for printing the final modified graphic image in a tangible medium.

13. The computerized system recited by claim 11 wherein the set of digitized data comprises a plurality of paintings fixed on tangible medium.

14. The computerized system recited by claim 11 wherein the set of digitized data comprises a plurality of sculptures fixed on tangible medium.

15. The computerized system recited by claim 11 wherein the set of digitized data comprises a plurality of image sequences.

16. The computerized system recited by claim 11 wherein the set of digitized data comprises a plurality of graphical designs.

17. The computerized system recited by claim 11 wherein the set of digitized data comprises a plurality of fashion designs.

18. The computerized system recited by claim 11 wherein the set of digitized data comprises a plurality of consumer product designs.

19. The computerized system recited by claim 11 further including a neural network for recognizing artistic features in works of art.

* * * * *